(12) United States Patent
Miller et al.

(10) Patent No.: US 8,869,251 B2
(45) Date of Patent: Oct. 21, 2014

(54) REMOTE PROVISION OF CONSISTENT ONE-TIME PASSWORD FUNCTIONALITY FOR DISPARATE ON-LINE RESOURCES

(75) Inventors: Eric W. Miller, Issaquah, WA (US); Clay D. Newton, City Napa, CA (US)

(73) Assignee: Bank of America Corporation, Charlotte, NC (US)

(*) Notice: Subject to any disclaimer, the term of this patent is extended or adjusted under 35 U.S.C. 154(b) by 1485 days.

(21) Appl. No.: 11/854,096

(22) Filed: Sep. 12, 2007

(65) Prior Publication Data
US 2008/0301460 A1 Dec. 4, 2008

Related U.S. Application Data

(60) Provisional application No. 60/941,325, filed on Jun. 1, 2007.

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |
| G06F 21/40 | (2013.01) |
| G06Q 20/42 | (2012.01) |

(52) U.S. Cl.
CPC ............ *H04L 63/0815* (2013.01); *G06F 21/40* (2013.01); *G06Q 20/42* (2013.01); *H04L 63/0838* (2013.01); *H04L 63/0853* (2013.01)
USPC ............ 726/6; 726/2; 726/3; 726/5; 713/168; 713/169; 713/170

(58) Field of Classification Search
CPC ............ H04L 63/0815; H04L 63/0853; H04L 63/0838; G06F 21/42; G06Q 20/40

USPC ........... 726/2, 3, 5, 6; 713/150, 168, 169, 170
See application file for complete search history.

(56) References Cited

U.S. PATENT DOCUMENTS

| 7,360,688 B1 * | 4/2008 | Harris | 235/380 |
| 7,578,436 B1 * | 8/2009 | Kiliccote | 235/380 |

(Continued)

FOREIGN PATENT DOCUMENTS

| EP | 1255392 A2 | 11/2002 |
| WO | 99/05813 A2 | 2/1999 |

OTHER PUBLICATIONS

Bank of America Corporation, PCT International Search Report, issued in corresponding International Patent Application No. PCT/US2008/065492, Mar. 23, 2009.

(Continued)

*Primary Examiner* — Luu Pham
*Assistant Examiner* — Jahangir Kabir
(74) *Attorney, Agent, or Firm* — Michael A. Springs; Moore & Van Allen, PLLC; Andrew D. Gerschutz (57) ABSTRACT

Consistent one-time password (OTP) functionality is provided from a presentation server to secure various on-line resources. A seed file can be provided to or created by a service provider for execution as part of a hosted page displayed at a client to a user. A presentation server receives a call from the seed file. A user interface widget can be initialized at the presentation server in response to the call from the seed file. The widget can be displayed as part of the remotely hosted Web page so that the user perceives the UI widget to be embedded in the page as viewed on the client computer system. Security for the interaction between the servers can be provided through use of security assertion markup language (SAML).

11 Claims, 5 Drawing Sheets

(56) References Cited

U.S. PATENT DOCUMENTS

| | | | |
|---|---|---|---|
| 7,673,141 B2* | 3/2010 | Kilian-Kehr et al. | 713/168 |
| 2002/0099942 A1 | 7/2002 | Gohl | |
| 2004/0139319 A1* | 7/2004 | Favazza et al. | 713/168 |
| 2004/0230489 A1* | 11/2004 | Goldthwaite et al. | 705/26 |
| 2005/0144452 A1* | 6/2005 | Lynch et al. | 713/170 |
| 2006/0081700 A1* | 4/2006 | Li | 235/380 |
| 2006/0156385 A1* | 7/2006 | Chiviendacz et al. | 726/2 |
| 2007/0022301 A1* | 1/2007 | Nicholson et al. | 713/184 |
| 2007/0056025 A1* | 3/2007 | Sachdeva et al. | 726/5 |
| 2007/0067828 A1* | 3/2007 | Bychkov | 726/3 |
| 2007/0136573 A1* | 6/2007 | Steinberg | 713/155 |
| 2007/0186103 A1* | 8/2007 | Randle et al. | 713/168 |
| 2007/0277044 A1* | 11/2007 | Graf et al. | 713/185 |
| 2008/0098464 A1* | 4/2008 | Mizrah | 726/5 |
| 2008/0230614 A1* | 9/2008 | Boalt | 235/492 |
| 2008/0263649 A1* | 10/2008 | Smadja et al. | 726/9 |
| 2008/0280644 A1* | 11/2008 | Hugot | 455/556.2 |

OTHER PUBLICATIONS

Bank of America Corporation, PCT Written Opinion, issued in corresponding International Patent Application No. PCT/US2008/065492, Mar. 23, 2009.

* cited by examiner

REMOTE PROVISION OF CONSISTENT
ONE-TIME PASSWORD FUNCTIONALITY
FOR DISPARATE ON-LINE RESOURCES

CROSS-REFERENCE TO RELATED
APPLICATION

This application claims priority from co-pending, commonly-owned provisional patent application Ser. No. 60/941,325, filed Jun. 1, 2007, the entire disclosure of which is incorporated herein by reference.

BACKGROUND

Identity verification methods related to authenticating and/or verifying users for access to secured systems are well known. One such method involves assigning a password to a user. When the user desires access to the secured system, the user inputs his or her ID and password to the system. The system confirms that the input password corresponds to the stored user ID and enables user access to the system. An enhanced version of this security technology is known as one-time password (OTP) authentication. OTP authentication uses a password that is transitory and only valid for a single use such that once used, the OTP is not valid for later access. The OTP may be time-based or event-based. Thus, even if the OTP is fraudulently obtained, the possibility that it can be used to gain access to a system is very limited.

The OTP is typically generated by a token possessed by the user and is input to an authentication system. The token may exist only to provide the OTP functionality, or the token may be embedded in some other device that provides additional functions. The input OTP is compared to an OTP generated by the system using the same information and encryption algorithm as is used by the token. If the input OTP matches the OTP generated at by the system, the user is allowed access to the system. Recently, services have been offered by information security technology vendors in which an OTP is sent to a user via a mobile device when needed, such as by short message service ("SMS") over a cellular telephone. With such a system, the user does not need to carry the token, but can simply use his or her mobile phone, which he or she may carry anyway, to provide the OTP function.

SUMMARY

Embodiments of the invention relate to using one-time password (OTP) functionality for Ecommerce, such as on-line banking. These embodiments of the invention provide for quickly implementing and presenting a common user authentication experience across multiple Web pages and applications while preserving the security and strong authentication capability required for certain customers and functions.

In at least some embodiments, a seed file is provided or created by a service provider for execution as part of a hosted page displayed at a client to a user, such as a customer of the service provider. A presentation server, which may be maintained by the service provider or by another party, receives a call from a seed file executing in association with the remotely hosted Web page. A user interface widget can then be initialized at the presentation server in response to the call from the seed file. The widget can be displayed as part of the remotely hosted Web page to that the user perceives the UI widget to be embedded in the page as viewed on the client computer system.

The widget can provide the OTP functionality to the customer from the presentation server for accessing on-line resources located at remotely hosted Web pages. The widget can serve to allow input of an OTP retrieved from a token, or through a wireless terminal such as a cellular telephone. In either case, in example embodiments, the presentation server carries out the OTP authentication functions. Since the widget is being provided by a centrally located presentation server, the OTP functions will be presented to the customer in a consistent manner no matter which service provider the customer is using.

In some embodiments, security can be enhanced through use of security assertion markup language (SAML). Once an OTP authentication is successful, the presentation server can provide the identity of the user of the client system to an SAML server. The SAML server returns an SAML artifact to the presentation server, which then provides the artifact to the widget. The artifact can then be returned to the SAML server by the service provider host through being embedded in a hidden form in the hosted page in order to verify the identity associated with the client.

In example embodiments, the OTP functions are provided and the widget user interface is supplied by a presentation server, which can be functionally connected to the SAML server, the service provider host, and a client system via a network such as the Internet. Two or more of these servers can be operated by the same organization, enterprise, or legal entity, or they may be separately operated and controlled. In a typical operating environment, the presentation server would provide OTP functionality to multiple service providers, so that whatever services a user accesses, only one OTP account needs to be maintained, and the user experience is identical across various services. Computing resources that form the presentation server and any other services in the system of the invention in combination with appropriate computer program code can provide the means to implement an embodiment of the invention.

DETAILED DESCRIPTION OF THE INVENTION

The following detailed description of embodiments refers to the accompanying drawings, which illustrate a specific embodiment of the invention. Other embodiments do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks. Computer program implemented steps or acts may also be combined with operator or human implemented steps or acts in order to carry out an embodiment of the invention.

Example embodiments of the invention can be used for applications such as on-line banking, and thus, some of the discussion herein refers to use of the invention in such a context. It cannot be overemphasized that such uses are an example only. The invention can find use in any time of on-line environment. The term "bank" and any similar terms are used herein in their broadest sense. Financial institutions that process transactions and documents of the types discussed can include stock brokerages, credit unions, and other types of institutions which are not strictly banks in the historical sense. Even retail and other service businesses, as well as manufacturers may process documents and/or data as disclosed herein. The use of terms such as bank, "institution" or "franchise" herein is meant to encompass all such possibilities.

Embodiments of the invention relate to using one-time password functionality for ecommerce, such as on-line banking. These embodiments of the invention provide for quickly implementing and presenting a common user authentication experience across multiple Web pages and applications while preserving the security and strong authentication capability required for certain customers and functions. Embodiments of the invention implement OTP functions using a user interface (UI) widget that allows applications to incorporate strong authentication functions quickly and easily while maintaining the security of strong authentication and the overall functionality and user experience of the overall application. The UI widget also provides the end user with a consistent experience every time they use the same strong authentication function—making the strong authentication easy to learn and consistent in presentation and use. A presentation server actually supplies the UI widget to the client each time it is needed. In the computer programming arts, a widget is an interface element that a computer user interacts with, such as a window or a text box. The UI widget of embodiments of the invention can be invoked by any Web page by embedding a seed file, without the Web page author having to understand or manage the OTP functionality.

The seed file in example embodiments of the invention can be a flash file that is embedded in a Web page to make calls to the presentation server. If the presentation server is unable to supply the UI widget functionality, the flash seed file can determine this and provide graceful error messages to the user. An example of code that might be included in the flash integration code that is used to instantiate a widget is shown in the appendix included with this specification.

Embodiments of the invention can be used in an environment where there are various on-line services and functions provided by an enterprise to its customers. In many modern business environments, an enterprise, such as a bank, contracts out much of its provision of on-line services, while maintaining its own, centralized customer records regarding passwords and accounts. Thus, one customer may access multiple services through a company's Web site, with each on-line service resource being hosted and maintained by a different vendor. For example, in an on-line banking scenario, a bank my contract on-line checking services to an electronic funds transfer vendor, and on-line credit card account management services to a credit card company. The bank could set-up appropriate connection facilities so that these vendors had access to appropriate customer credentials to authenticate users, but specific, user interface elements for each Web host might be different. In such an environment, embodiments of the invention, by contrast, ensure that the user interface for OTP entry looks the same regardless of where an on-line resource is hosted.

It is important to keep in mind that references made herein to "remotely hosted" resources such as a remotely hosted Web page do not necessarily restrict the embodiments described to situations where one entity maintains the OTP functionality and another entity acts as a service provider. Indeed, embodiments of the invention can be just as useful in providing OTP functionality consistently for various services that a provided and hosted in-house by an enterprise, regardless of whether a service provider is truly remote in the generic sense, or on-line services are hosted at the same place using the same facilities that are used to implement the presentation server described herein.

In example embodiments of the invention, the Web page to include OTP protected functions can use the seed file to initialize the widget so that the initialization is transparent to the client. OTP request, validation, and synchronization are also transparent. The widget also uses security assertion markup language (SAML) assertions and artifacts for added security. The widget can retrieve an SAML artifact and use a javascript to pass the artifact to hidden field on a Web form being used to access an on-line service. The form is posted and the artifact can be used by the on-line application to request the assertion for the public facing URL of the on-line resource with which an embodiment of the invention is being used.

SAML is a standard promulgated in 2003 by the Organization for the Advancement of Structured Information Standards (OASIS) group. SAML is different from other security approaches mostly because of its expression of security in the form of assertions about subjects. With SAML, any point in the network can assert that it knows the identity of a user or piece of data. It is up to the receiving application to accept or reject the assertion. Any SAML-compliant software can assert its authentication of a user or data. SAML uses extensible markup language (XML) tags to exchange identity information across domain boundaries.

The UI widget according to example embodiments of the invention is a flash based component hosted on an independent presentation server. In order to invoke the widget, the on-line resource provider site needs to provide the IP/server address of the URL which will be making the request to load the flash widget. This address can be added to a crossdomain.xml file, which restricts the UI widget from being called by unauthorized Web sites. These embodiments of the invention provide a browser side interface. The flash seed file is placed on the host site. This seed file's function is to call the presentation server and load the main portions of the UI widget. The seed file detects situations where communication between the customer's browser and the presentation server is not functioning properly. The flash code is embedded in the client Web page where the function is required.

Depending on the specific interaction requirements for the service provider page, the UI widget, once downloaded, can be placed on the page or in a hidden DIV and revealed as needed. The hidden form variable to accept the SAML artifact is also written into the page. A client side javascript function is also written to accept the artifact from the UI widget and move the artifact to a hidden form variable. The on-line resource server in example embodiments includes a server side process to create an SAML assertion request from the artifact, post to an assertion retrieval service and validate the assertion.

A device for use with the UI widget and the presentation server described herein can be a standard OTP token. Additionally, the OTP functionality can be integrated with a credit or debit card. There are also services that provide OTP functionality through a mobile phone by generating the one-time password and sending it via the cellular short message services (SMS). This and other OTP functions can be provided by various well-known firms, for example, Verisign and/or RSA Security.

Figure 1:
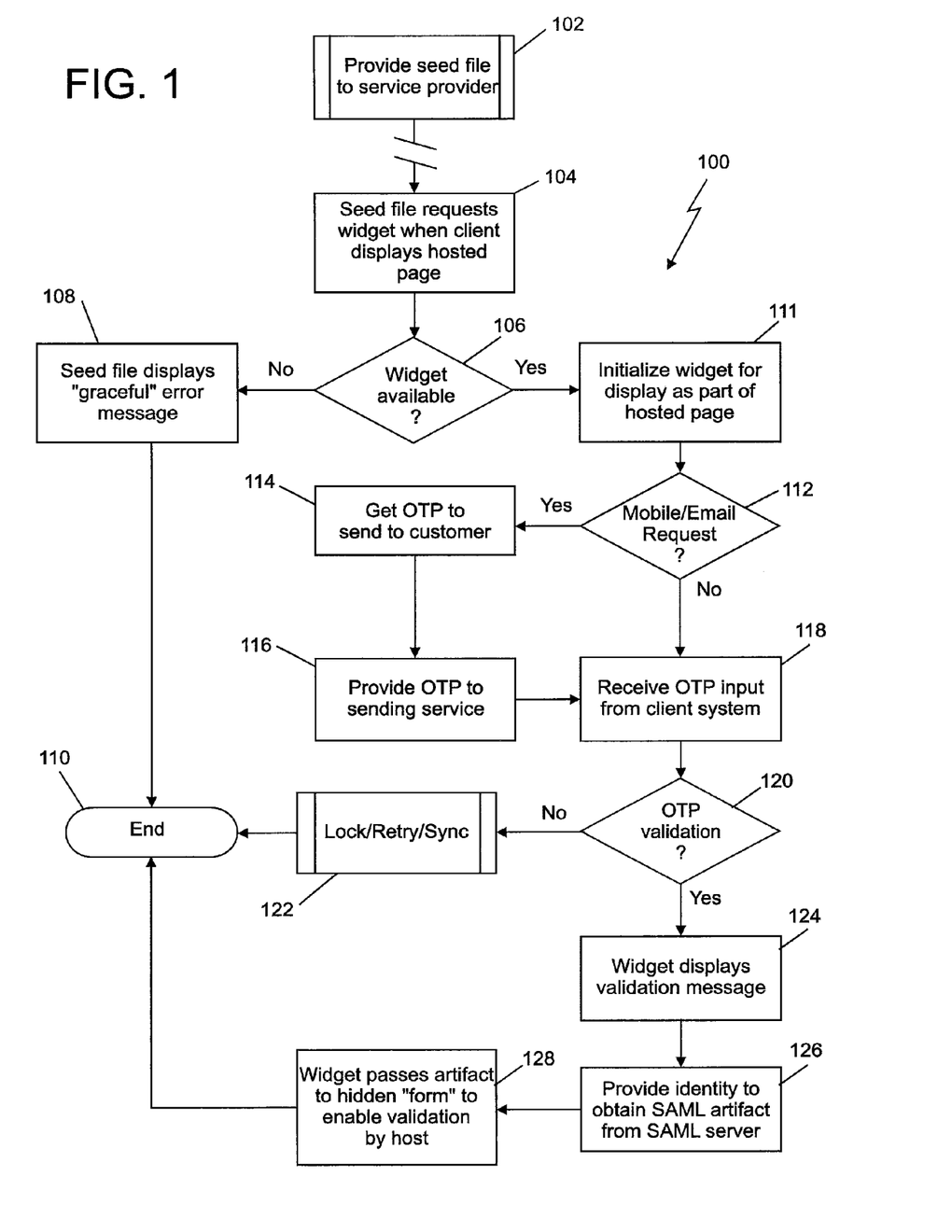
FIG. 1 is a flowchart illustration of a process according to example embodiments of the invention.

FIG. 1 provides a flowchart illustration of a process of an example embodiment of the present invention. Like most flowcharts, FIG. 1 presents process 100 as a series of process or sub-process blocks. At block 102, the seed file is provided to the service provider, whether the service provider is an external entity, or within the enterprise implementing the invention. The seed file may be provided by delivering the file on a recorded medium, or on-line. Additionally, the provision of the seed file to the service provider is optional; instructions may instead be provided to enable the service provider to create its own seed file. In most circumstances, the seed file is provided once, and updated as needed. The rest of process 100 is repeated every time a user accesses OTP protected resources of the enterprise implementing the invention, as indicated by the break between block 102 and block 104 of process 100 shown in FIG. 1.

When a user navigates to a protected resource within the enterprise using a standard Web browser, the hosted page is displayed to the user at a client computer system. At block 104 of FIG. 1, when the hosted page is displayed to the user and the embedded seed file calls the presentation server to obtain the widget to be rendered and presented. In a typically operating environment, when a request for the widget is processed, customer directory databases are accessed to obtain the appropriate preferences with which the user will access the protected resource. The request is then passed to the presentation server. At block 106 a determination is made as to whether the widget is available. For example, the widget would not be available if the presentation server was down. In such a case the seed file can display a graceful error message at block 108. In this example embodiment, the process would end at block 110. The termination of the process in this case may consist of causing the user's browser to go back to the last page, or the main entry portal for customers of the enterprise.

Still referring to FIG. 1, at block 111, the widget is initialized and displayed as part of the hosted page. During this process the presentation server, in example embodiments, can generate a session cookie to keep track of this particular customer's session. At block 112 a determination is made as to whether the customer is to use a token to obtain an OTP, or the customer is to request an OTP to be forwarded via Email or mobile messaging, such as the short message service (SMS) of the cellular telephone system. In example embodiments, this determination is made by receiving user interaction through the user interface widget. If the user requests an OTP be sent, the presentation server obtains the OTP at block 114, and provides the OTP to a sending service at block 116. This sending service may be an Email server such as a simple mail transfer protocol (SMTP) server, or an SMS service provider with resources connected to the mobile telephone system. In either case the OTP is eventually input at the client system through the widget at block 118.

When a widget as described herein submits an OTP and a validation request as received by the presentation server at block 118 of FIG. 1, the widget also returns the session cookie described above. If the cookie is valid, the presentation server can put a globally unique identifier (GUID) in a header to be received by the on-line application which is being protected by the OTP functions. The GUID provides a way to verify the session integrity using the aforementioned cookie. The GUID and the cookie as described above can be used to validate the client side javascript function which is used to handle the SAML artifact.

Returning to FIG. 1, at block 120, the OTP input by the customer is validated. If OTP validation fails at block 120, processing passes to block 122 where the customer's accounts can be locked, the customer can be given the opportunity to retry OTP entry, or a routine to synchronize the customer's token with the OTP function in the presentation server can be executed. These options for handling a failure of OTP validation can be handled in the manner known in the art with respect to OTP services. Assuming OTP validation at block 120 is successful, the widget displays an appropriate validation message at block 124 of FIG. 1.

Staying with FIG. 1, at block 126, the presentation server provides an identity to the SAML artifact server to obtain an SAML artifact. The artifact is then returned to the presentation server by the SAML artifact server. At block 128, the widget passes the artifact to a hidden form on the Web page being displayed to the user. When the user then submits a request for services, the artifact can be retrieved by the service provider host. The process of the presentation server providing the OTP functionality to the protected on-line resource ends again at block 110. However, the service provider host will extract the SAML artifact and make an assertion retrieval call with the SAML artifact server. If the assertion is valid, the OTP protected page will be returned to the user, who can then proceed with the intended on-line activities. If the assertion is invalid, the on-line session can be terminated by the service provider host with an appropriate message presented to the user as is known in the art.

Figure 2:
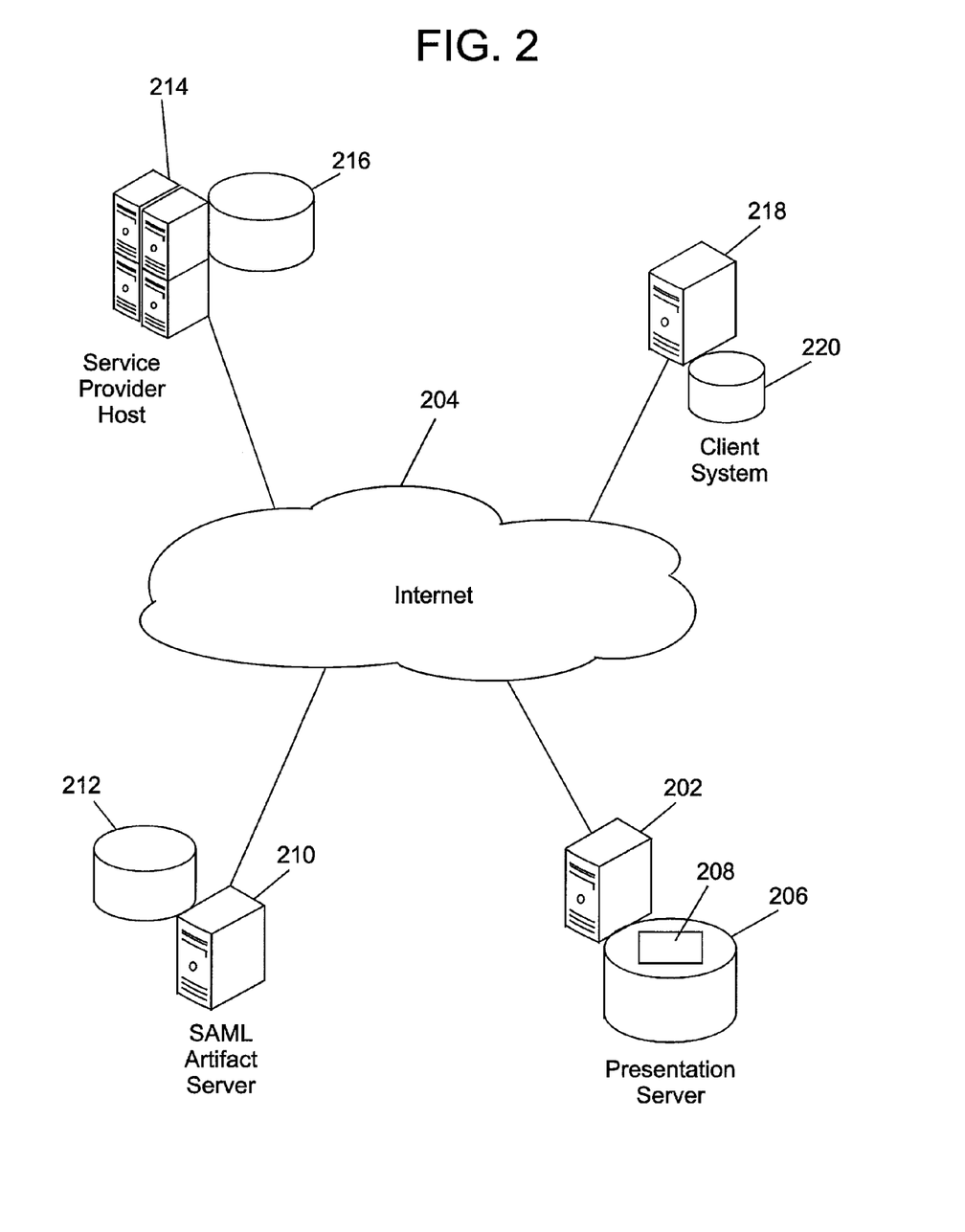
FIG. 2 is a system block diagram that illustrates the operating environment of example embodiments of the invention.

FIG. 2 presents a system block diagram illustrating an operating environment for example embodiments of the present invention. The example system of FIG. 2 includes a presentation server, 202, connected to the Internet, 204. Presentation server 202 in example embodiments is an instruction execution platform maintaining the widget so that the widget can be initiated in response to a call from a seed file. Server 202 in this example also maintains the OTP functionality to verify an OTP input to the widget at the client after being retrieved by the user from either a token or the user's mobile terminal. Presentation server 202 includes fixed storage medium 206 for storing programs and/or data which enable the use of an embodiment of an invention. A computer program product in the form of computer program code 208 can be stored on fixed medium 206 of presentation server 202. A computer program product implementing the invention can be based on other types of media, for example, a magnetic or optical removable disk.

In the example embodiment of FIG. 2, SAML artifact server 210 is also connected to Internet 204. Artifact server 210 also includes a storage medium, 212, where assertion information and artifacts can be stored, as well as where computer program code to operate the SAML artifact server resides when the server is in operation. Service provider host 214 also includes a storage medium, 216. The service provider hosts the on-line service Web page that is accessed by a user when an embodiment of the invention is used. Service provider host 214 is also connected to Internet 204. Finally, client system 218 is a personal computer or workstation from which a user accesses on-line services at service provider host 214. Client system 218 includes a storage medium, 220, on which computer program code for implementing a Web browser typically resides. A user makes use of client system 218 to access a hosted page at service provider host 214. Service provider host 214 contacts presentation server 202 in order to have a widget rendered by the presentation server at client system 218 as part of a Web page being viewed by a user.

The remaining diagrams illustrate an example user interface widget according to embodiments of the invention. It can be assumed for purposes of this example that some end users employ a token, which is in the form of an OTP generator combined with or embedded in a credit or debit card. Such a device can serve as a combination conventional financial transaction card and OTP generator. The OTP can be generated using existing algorithms. A visual and/or audio display is provided on the card to output the OTP to the user. The end user inputs the OTP to access systems on-line, telephonically or otherwise, including to the UI widget of the present invention. The credit/debit card functionality of the device can be used apart from its use as an OTP generator. By combining the OTP token and a credit/debit card, the OTP generator can be conveniently carried without increasing the number of personal effects carried by the user.

Figure 3:
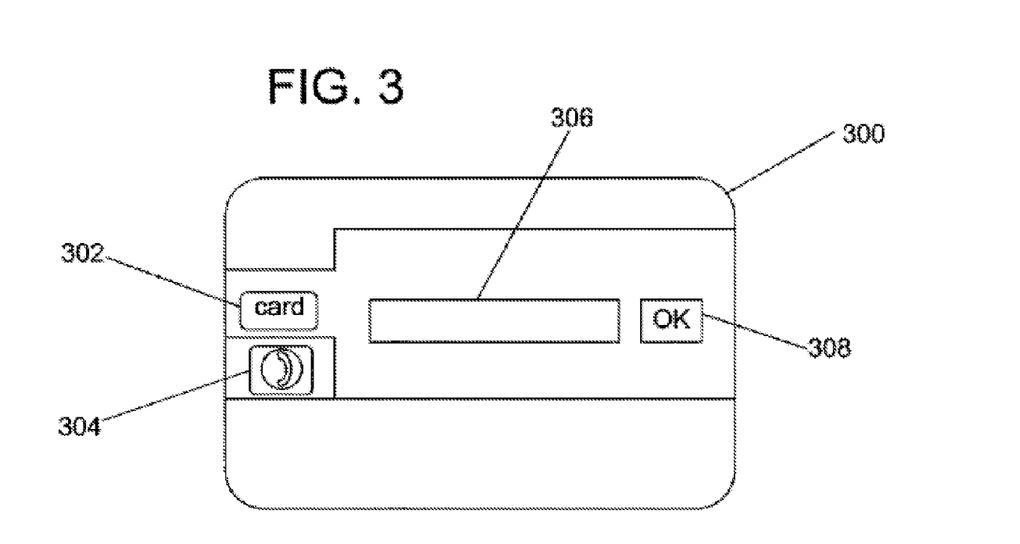
FIGS. 3-8 are wireframe diagrams that illustrate various states of a user interface widget according to example embodiments of the invention.

FIGS. 3-8 present wireframe diagrams of the user interface widget according to an example embodiment of the present invention. These diagrams indicate various possible states of the widget as viewed by the user. In a typical operating environment, the widget would be one element within a larger Web page, for example, a Web page to login to an on-line bill payment service. FIG. 3 illustrates widget 300 as it might initially be presented. The widget includes a button, 302, which indicates the entry of a one-time password from a check or credit card, which in this example includes the one-time password generator. Hence, the button is labeled with the term "card" although it could just as easily be labeled with term "token" if the user was obtaining the OTP from a separate token. Button 304 would be activated by the user with a mouse clock if the user intended to obtain an OTP over his or her mobile telephone. Hence, button 304 includes an icon for a telephone. Text entry box 306 is where a user would enter his or her OTP prior to pushing OK button 308.

Figure 4:
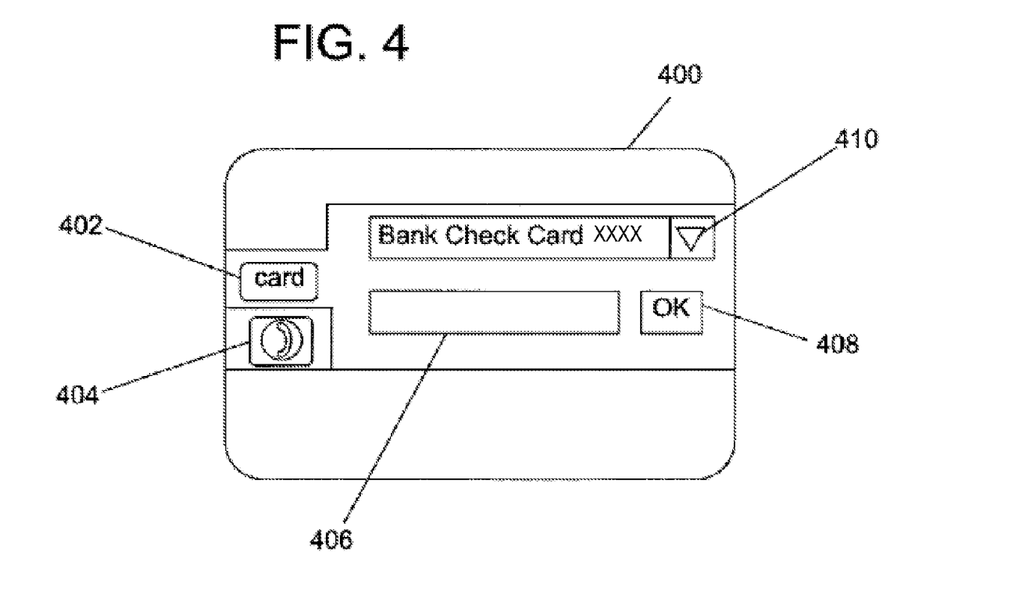
Figure 5:
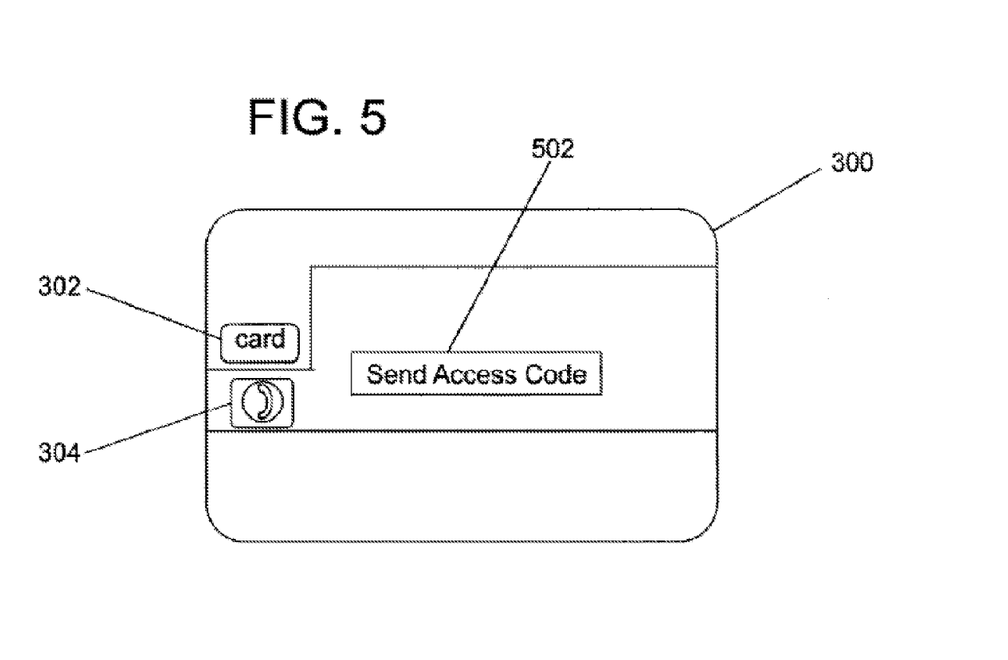
Figure 6:
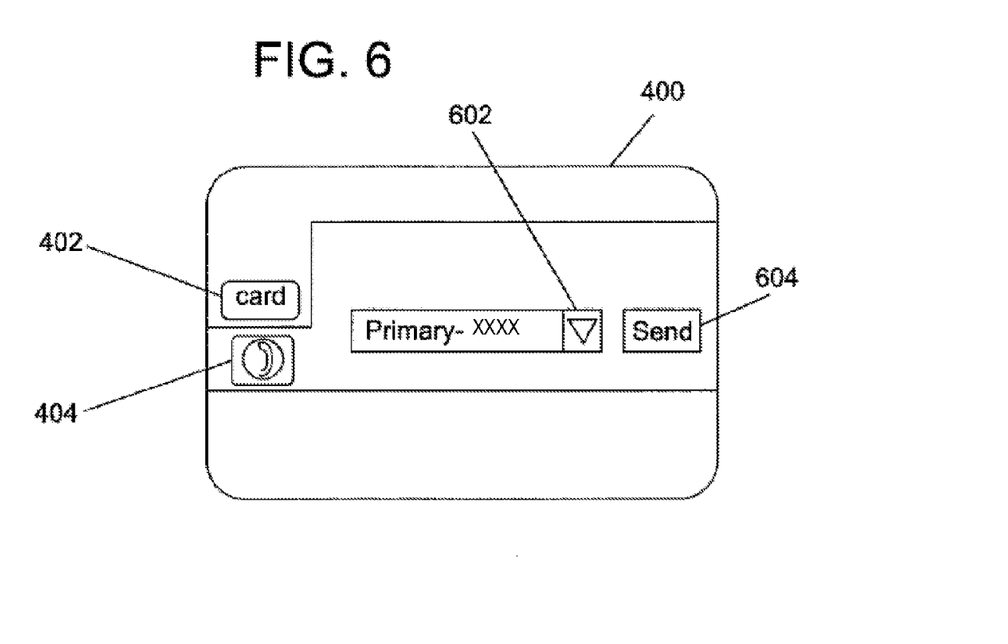

FIG. 4 presents an alternative version of the widget of the embodiment of the invention. Widget 400 in FIG. 4 includes card button 402 and telephone button 404. Entry box 406 is included in a similar fashion as shown previously, along with OK button 408. This version of the widget however, includes drop-down box 410 which allows a customer to select from multiple cards which include an OTP generator. Typically, a customer would have previously set up the account preferences to accommodate the various cards available to the customer. In this particular view, a bank check card ending in the number "XXXX" is selected FIG. 5 illustrates the same widget as illustrated in FIG. 3, widget 300 with card button 302 and mobile phone button 304 as before. However, in this case, mobile button 304 has been activated and button 502 appears, which the customer pushes with a mouse click in order to prompt the system to send the current OTP via mobile phone, for example via SMS. Similarly, FIG. 6 illustrates widget 400, which supports drop-down boxes, set up for SMS messaging with multiple possible telephone numbers. Again, the mobile phone button 404 is activated. With widget 400, drop-down box 602 appears accompanied by send button 604. A user selects the appropriate telephone number. In this example a telephone number deemed by the customer during setup to be his or her "primary" phone number which ends in the digits "XXXX" is selected. Once the user selects the appropriate telephone number, the user clicks button 604 to initiate the retrieval of his or her current OTP and the forwarding of the OTP to his or her mobile phone via SMS.

Figure 7:
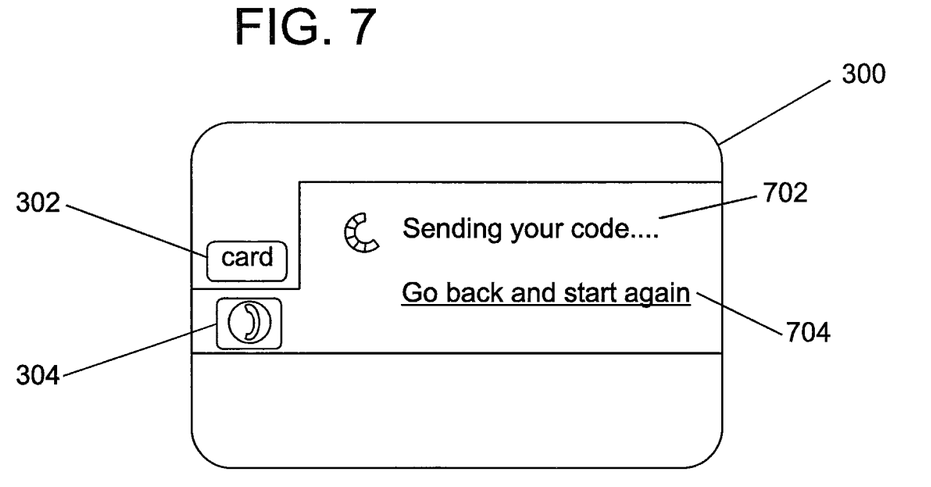
Figure 8:
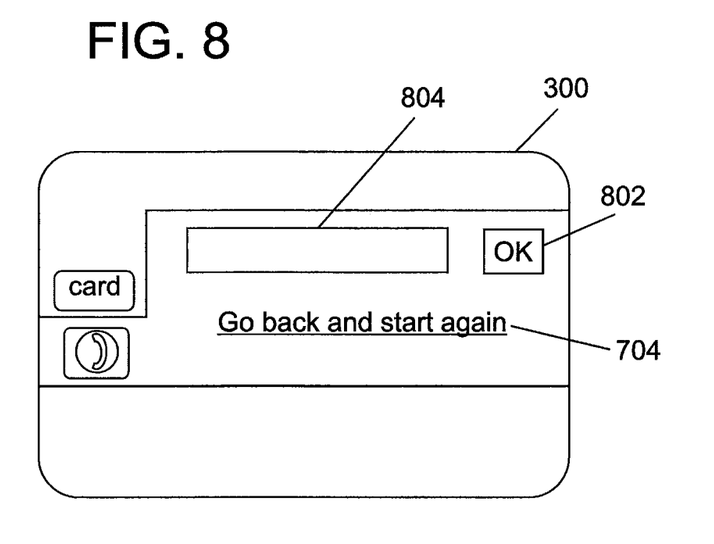

FIGS. 7 and 8 illustrate additional states of widget 300 after the "send access code" button, 502 of FIG. 5, is pressed via a mouse click. In FIG. 7, widget 300 displays message 702, "Sending your code . . . " after the button is depressed, while the presentation server is interacting with the enterprise's messaging vendor. Link 704 is also provided, which the user can click to reset the widget and start again if needed. For example, a user may want to interrupt the process and begin again if he or she realizes that the phone which was selected is not available, or is non-functional, for example, due to a dead battery. FIG. 8 illustrates widget 300 after the code has been sent via the mobile phone network, now awaiting input of the OTP, which the user can retrieve from his or her telephone. The "Go back and start again" link, 704, is still provided. Button 802 is depressed with a mouse click after the OTP is retrieved from the phone and entered by the user in box 804.

In the example embodiments disclosed herein, the hosted website will display a page at the client which includes the flash seed file, a javascript file for interacting with the widget, and the hidden form which is used to contain the SAML artifact. For convenience, the seed file may execute in a DIV tag. The widget can be initialized with an application programming interface (API) call which loads the customer's preferences, for example, devices, cards, phone numbers, etc. Normally, the OTP protected resource of the service provider is not available for access by the customer until the service provider host has received a confirmation from the SAML artifact server regarding the identity of the user.

Included at the end of this specification before the claims is an example source code listing. This source code listing is entitled, "Source Code Listing Submitted as Part of the Specification." The first block of code in the Appendix is an example of the flash integration code that can be used to instantiate the widget. In order to call the widget from a service provider page, the IP address of the calling application must be presented to the presentation server. This IP address will be put in the presentation application crossdomain.xml file, which enables cross site access from the flash based widget to the presentation application. In addition, the service provider may be required pass specific parameters, including page, and URL.

The second block of code in the Appendix illustrates how the widget might call a client hosted javascript function, passing the artifact from the presentation application. The signature for this function is "sendToJavascript(variable)" where the variable is the artifact. In example embodiments, it would be the service provider's duty to implement the logic of this method, depending on the specific interaction required for this page. One responsibility the client page must complete is to copy the passed artifact from the argument to a hidden field on the submit form. It is the option of the page designer to determine if the widget should be hidden or displayed, and if the page submit should be automatically triggered off validation or a separate user step.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention.

SOURCE CODE LISTING SUBMITTED AS PART OF THE SPECIFICATION

```
<!-- saved from url=(0014)about:internet -->
<html lang="en">
<head>
<meta http-equiv="Content-Type" content="text/html; charset=utf-8" />
<title></title>
<script src="flex/AC_OETags.js" language="javascript"></script>
<style>
body { margin: 0px; overflow:hidden }
</style>
</head>
<body>
    <form name="form1" onsubmit="return false;">
      <input type="hidden" name="artifact" />
    </form>
<script language="JavaScript" type="text/javascript" src="flex/history.js"></script>
<script language="JavaScript" type="text/javascript">
<!--
// Version check for the Flash Player that has the ability to start Player Product Install (6.0r65)
var hasProductInstall = DetectFlashVer(6, 0, 65);
// Version check based upon the values defined in globals
var hasRequestedVersion = DetectFlashVer(requiredMajorVersion, requiredMinorVersion, requiredRevision);
// Check to see if a player with Flash Product Install is available and the version does not meet the requirements for
playback
if ( hasProductInstall && !hasRequestedVersion ) {
    // MMdoctitle is the stored document.title value used by the installation process to close the window that
started the process
    // This is necessary in order to close browser windows that are still utilizing the older version of the player
after installation has completed
    // DO NOT MODIFY THE FOLLOWING FOUR LINES
    // Location visited after installation is complete if installation is required
    var MMPlayerType = (isIE == true) ? "ActiveX" : "PlugIn";
    var MMredirectURL = window.location;
  document.title = document.title.slice(0, 47) + " - Flash Player Installation";
  var MMdoctitle = document.title;
        AC_FL_RunContent(
           "src", "widgetLoader",
           "width", "100%",
           "height", "100%",
           "align", "middle",
           "id", "widgetLoader",
           "quality", "high",
           "bgcolor", "#869ca7",
           "name", "widgetLoader",
======> "flashvars",'page=xxx&historyUrl=flex/history.htm%3F&lconid=' + lc_id + ",
           "allowScriptAccess","sameDomain",
           "type", "application/x-shockwave-flash",
           "pluginspage", "http://www.adobe.com/go/getflashplayer"
```

```
   );
} else if (hasRequestedVersion) {
   // if we've detected an acceptable version
   // embed the Flash Content SWF when all tests are passed
      AC_FL_RunContent(
         "src", "widgetLoader",
         "width", "100%",
         "height", "100%",
         "align", "middle",
         "id", "widgetLoader",
         "quality", "high",
         "bgcolor", "#869ca7",
         "name", "widgetLoader",
======> "flashvars",'page=xxx&historyUrl=flex/history.htm%3F&lconid=' + lc_id + '',
         "allowScriptAccess", "sameDomain",
         "type", "application/x-shockwave-flash",
         "pluginspage", "http://www.adobe.com/go/getflashplayer"
      );
} else { // flash is too old or we can't detect the plugin
  var alternateContent = 'Alternate HTML content should be placed here. '
   + 'This content requires the Adobe Flash Player. '
   + '<a href=http://www.adobe.com/go/getflash/>Get Flash</a>';
  document.write(alternateContent); // insert non-flash content
  }
// -->
</script>
<noscript>
   <object classid="clsid:D27CDB6E-AE6D-11cf-96B8-444553540000"
         id="widgetLoader" width="100%" height="100%"
         codebase="http://fpdownload.macromedia.com/get/flashplayer/current/swflash.cab">
      <param name="movie" value="widgetLoader.swf" />
      <param name="quality" value="high" />
      <param name="bgcolor" value="#869ca7" />
      <param name="allowScriptAccess" value="sameDomain" />
      <embed src="widgetLoader.swf" quality="high" bgcolor="#869ca7"
         width="100%" height="100%" name="widgetLoader" align="middle"
         play="true"
         loop="false"
         quality="high"
         allowScriptAccess="sameDomain"
         type="application/x-shockwave-flash"
         pluginspage="http://www.adobe.com/go/getflashplayer">
      </embed>
   </object>
</noscript>
<iframe name="_history" src="flex/history.htm" frameborder="0" scrolling="no" width="22" height="0"></iframe>
</body>
</html>
<script language="JavaScript" type="text/javascript">
<!--
// ---------------------------------------------------------------------------
// Globals
// Major version of Flash required
var requiredMajorVersion = 9;
// Minor version of Flash required
var requiredMinorVersion = 0;
// Minor version of Flash required
var requiredRevision = 0;
// ---------------------------------------------------------------------------
//
// callback functions
//
function sendToJavaScript(value) {
   document.forms["form1"].artifact.value =value;
   alert("Posted artifact: "+ document.forms["form1"].artifact.value);
}
function redrawMegaWidget(value) {
   document.getElementById('widgetLoader').style.width=325;
   document.getElementById('widgetLoader').style.height=270;
}
// -->
</script>
```

The invention claimed is:

1. A method for authenticating a user prior to providing the user with access to secure online resources, wherein the method provides a common user authentication experience across multiple Web pages, the method comprising:
    receiving a call at a presentation server in response to an execution of a seed file, wherein the seed file is associated with a remotely hosted Web page displayed at a client, wherein the client is accessible to the user, wherein the seed file is a flash file that is embedded in the remotely hosted Web page and configured to make calls to the presentation server;
    initializing a widget at the presentation server in response to the call, wherein the widget is a user display interface element that is loaded on the remotely hosted Web page by the presentation server;
    loading the widget from the presentation server onto the remotely hosted Web page;
    presenting the widget to the user on the remotely hosted web page, wherein presenting the widget on the remotely hosted Web page provides a common user authentication experience across multiple Web pages by providing a common user display interface element across multiple Web pages;
    receiving at the presentation server and from the user a request for a one-time password by the common user display interface element of the widget;
    generating a one-time password by the presentation server;
    sending the one-time password from the presentation server to an input device of a credit/debit card over a network connection by a simple mail transfer protocol, wherein the credit/debit card is accessible to the user and comprises the input device configured to receive messages by the simple mail transfer protocol and an output device configured to display information to the user;
    displaying the one-time password to the user on the output device allowing the user to view the one-time password;
    receiving, from the user, the one-time password by the common user display interface element;
    verifying, by the presentation server, that the one-time password received from the user matches the one-time password sent to the user; and
    providing, by the presentation server, the user with access to the secure online resources in response to the verifying.

2. The method of claim 1 further comprising:
    providing an identity associated with the client to a security assertion markup language (SAML) server;
    retrieving an SAML artifact from the SAML server; and
    providing the SAML artifact to the widget for embedding by the presentation server in the remotely hosted Web page as a means of verifying the identity associated with the client.

3. The method of claim 2 further comprising providing the seed file to a service provider maintaining the remotely hosted Web page.

4. The method of claim 1, wherein the receiving the one-time password is based at least partially on the user inputting the one-time password into a field included in the widget.

5. A computer program product, stored on a non-transitory computer-readable medium and executed by one or more processor, authenticates a user prior to providing the user with access to secure online resources and provides a common user authentication experience across multiple Web pages, the computer program comprising:
    instructions for receiving a call at a presentation server in response to an execution of a seed file, wherein the seed file is associated with a remotely hosted Web page displayed at a client, wherein the client is accessible to the user, wherein the seed file is a flash file that is embedded in the remotely hosted Web page and configured to make calls to the presentation server;
    instructions for initializing a widget at the presentation server in response to the call, wherein the widget is a user display interface element that is loaded on the remotely hosted Web page by the presentation server;
    instructions for loading the widget from the presentation server onto the remotely hosted Web page;
    instructions for presenting the widget to the user on the remotely hosted web page, wherein presenting the widget on the remotely hosted Web page provides a common user authentication experience across multiple Web pages by providing a common user display interface element across multiple Web pages;
    instructions for receiving at the presentation server and from the user a request for a one-time password by the common user display interface element of the widget;
    instructions for generating a one-time password by the presentation server;
    instructions for sending the one-time password from the presentation server to an input device of a credit/debit card over a network connection by a simple mail transfer protocol, wherein the credit/debit card is accessible to the user and comprises the input device configured to receive messages by the simple mail transfer protocol and an output device configured to display information to the user;
    instructions for displaying the one-time password to the user on the output device allowing the user to view the one-time password;
    instructions for receiving, from the user, the one-time password by the common user display interface element;
    instructions for verifying, by the presentation server, that the one-time password received from the user matches the one-time password sent to the user; and
    instructions for providing, by the presentation server, the user with access to the secure online resources in response to the verifying.

6. The computer program product of claim 5 wherein the computer program code further comprises:
    instructions for providing an identity associated with the client to a security assertion markup language (SAML) server;
    instructions for retrieving an SAML artifact from the SAML server; and
    instructions for providing the SAML artifact to the widget for embedding by the presentation server in the remotely hosted Web page as a means of verifying the identity associated with the client.

7. The computer program product of claim 5, wherein the one-time password is received based at least partially on the user inputting the one-time password into a field included in the widget.

8. A system for authenticating a user prior to providing the user with access to secure online resources, wherein the system provides a common user authentication experience across multiple Web pages, the system comprising:
    a widget;
    a credit/debit card; and
    a presentation server comprising a memory and a processor, the processor is configured to:
        receive a call at the presentation server in response to an execution of a seed file, wherein the seed file is associated with a remotely hosted Web page displayed at a client, and wherein the web page is displayed at a client accessible to a user, wherein the seed file is a flash file that is embedded in the remotely hosted Web page and configured to make calls to the presentation server;

initiate the widget in response to the call, wherein the widget is a user display interface element that is loaded on the remotely hosted Web page by the presentation server;

load the widget from the presentation server onto the remotely hosted Web page;

present the widget to the user through the web page, wherein presenting the widget on the remotely hosted Web page provides a common user authentication experience across multiple Web pages by providing a common user display interface element across multiple Web pages;

receive at the presentation server and from the user a request to send a one-time password to the user by the common user display interface element of the widget;

generate a one-time password by the presentation server;

send the one-time password from the presentation server to an input device of a credit/debit card over a network connection by a simple mail transfer protocol, wherein the credit/debit card is accessible to the user and comprises the input device configured to receive messages by the simple mail transfer protocol and an output device of the credit/debit is configured to display information to the user;

display the one-time password to the user on the output device allowing the user to view the one-time password;

receive, from the user, the one-time password by the common user display interface element;

verify that the one-time password received from the user matches the one-time password sent to the user outside of the client; and provide the user with access to secure online resources after verifying that the one-time password received from the user matches the one-time password sent to the user outside of the client.

9. The system of claim 8 further comprising a service provider host connected to the presentation server, the service provider host to host the Web page and to execute the seed file as part of the Web page.

10. The system of claim 9 further comprising a security assertion markup language (SAML) server connected to the presentation server and the service provider host, the SAML server to receive an identity associated with the client, to provide an SAML artifact for embedding in the Web page, and to verify the identity associated with the client in response to the returned SAML artifact by the remotely hosted Web page.

11. The system of claim 8 further comprising a security assertion markup language (SAML) server connected to the presentation server, the SAML server to receive an identity associated with the client, to provide an SAML artifact for embedding by the presentation server in the Web page, and to verify the identity associated with the client in response to the returned SAML artifact by the remotely hosted Web page.

* * * * *